United States Patent [19]
Yoshimura et al.

[11] Patent Number: 5,093,789
[45] Date of Patent: Mar. 3, 1992

[54] OIL PRESSURE CONTROL SYSTEMS FOR AUTOMATIC TRANSMISSIONS

[75] Inventors: Hiroshi Yoshimura; Takuji Fujiwara; Kozo Ishii; Kazuo Takemoto, all of Hiroshima, Japan

[73] Assignee: Mazda Motor Corporation, Hiroshima, Japan

[21] Appl. No.: 461,913

[22] Filed: Jan. 8, 1990

[30] Foreign Application Priority Data

Jan. 10, 1989 [JP] Japan .................................. 1-3051

[51] Int. Cl.$^5$ .............................................. B60K 41/18
[52] U.S. Cl. ................................ 364/424.1; 74/867; 74/866
[58] Field of Search ............... 364/424.1; 74/867, 868, 74/862, 856, 866

[56] References Cited

U.S. PATENT DOCUMENTS

| | | | |
|---|---|---|---|
| 4,283,970 | 8/1981 | Vukovich | 74/866 |
| 4,742,461 | 5/1988 | Eschrich et al. | 364/424.1 |
| 4,783,743 | 11/1988 | Yashiki et al. | 364/424.1 |
| 4,791,568 | 12/1988 | Hiramatsu et al. | 364/424.1 |
| 4,798,105 | 1/1989 | Takase et al. | 74/868 |
| 4,833,945 | 5/1989 | Kondo | 364/424.1 |
| 4,870,581 | 9/1989 | Ito et al. | 364/424.1 |
| 4,928,557 | 5/1990 | Takada et al. | 74/867 |
| 4,953,090 | 8/1990 | Narita | 74/867 |
| 4,981,053 | 1/1991 | Yamaguchi | 74/866 |
| 4,989,147 | 1/1991 | Ishii | 364/424.1 |
| 4,998,451 | 3/1991 | Sano | 74/866 |
| 5,007,308 | 4/1991 | Narita | 74/866 |

*Primary Examiner*—Parshotam S. Lall
*Assistant Examiner*—V. Trans
*Attorney, Agent, or Firm*—Sixbey, Friedman, Leedom & Ferguson

[57] ABSTRACT

An oil pressure control system for an automatic transmission employed in a vehicle comprises a device for producing line pressure, a device for supplying engaging friction elements in the automatic transmission with operating oil pressure obtained from the line pressure, a device for determining a pressure control variable based on operating condition of an engine with which the automatic transmission is coupled, a device for determining a supplemental control variable based on a duration of speed change or a state of speed change in the automatic transmission, a device for revising the supplemental control variable in accordance with the operating condition of the engine to produce a revised supplemental control variable, a device for revising the pressure control variable in accordance with the revised supplemental control variable to produce a revised pressure control variable, and a control device operative to control the line pressure in accordance with the revised pressure control variable when a specific speed change operation is performed in the automatic transmission.

10 Claims, 9 Drawing Sheets

OIL PRESSURE CONTROL SYSTEMS FOR AUTOMATIC TRANSMISSIONS

BACKGROUND OF THE INVENTION

1. Field of the Invention

The present invention relates generally to oil pressure control systems for automatic transmissions employed in vehicles, and more particularly, to a system for controlling oil pressure applied through an oil hydraulic control circuit to engaging friction elements or other operating elements in an automatic transmission provided in a vehicle.

2. Description of the Prior Art

There has been commonly used in vehicles an automatic transmission which is coupled with an engine provided in the vehicle and includes a torque converter comprising a pump impeller, a turbine runner and a stator, and a power transmitting gear arrangement including a speed change mechanism having engaging friction elements, such as clutch and brake elements, operating with oil pressure. The automatic transmission employed to be coupled with the engine in the vehicle is usually accompanied with an oil pressure control system including an oil hydraulic control circuit. The oil hydraulic control circuit comprises a line pressure producing portion including a regulator valve which is operative to produce line pressure by adjusting oil pressure obtained from an oil pump and an operation oil pressure producing portion including a manual shift valve caused manually to perform shifting range change, a plurality of shift valves each producing operating oil pressure based on the line pressure and supplying selectively the engaging friction elements in the power transmitting gear arrangement with the operating oil pressure and a plurality of solenoid valves operative to change operating conditions of the shift valves, respectively.

On the occasion of speed change control performed in the automatic transmission, in a control unit provided in the oil pressure control system, engine road and vehicle speed actually detected are collated with shifting lines in a predetermined speed change characteristic map stored in a memory device in the control unit to detect a shifting condition which is satisfied on that occasion, and a driving signals are supplied from the control unit to the solenoid valves provided in the operating oil pressure producing portion in response to the shifting condition detected by the control unit so as to change operating conditions of the shifting valves. With the change in the operating conditions of the shifting valves, one or more of the engaging friction elements are caused to be in engagement or disengagement and thereby a speed change operation is carried out in the automatic transmission.

In respect of the oil pressure control system, there have been proposed to provide the line pressure producing portion with a solenoid valve and to control the length of each period of time in which the solenoid valve is kept in its ON state is controlled to vary minutely the line pressure obtained from the line pressure producing portion as disclosed in, for example, the Japanese patent application published before examination under publication number 54-2349.

Further, it has been also proposed an oil pressure control system in which the line pressure obtained from the line pressure producing portion is varied in response to each speed change condition so that abrasion on the engaging friction elements is reduced and shocks caused by the speed change are restrained.

In the oil pressure control system for the automatic transmission as described above, a pressure control variable used for controlling the line pressure is usually determined in response to, for example, actual opening degree of a throttle valve so as not to reflect dispersion in characteristic and aged deterioration of each automatic transmission. Therefore, it is feared that the pressure control variable used for controlling the line pressure comes to be unfit for the speed change operation carried out in the automatic transmission due to the dispersion in characteristic and the aged deterioration of each automatic transmission so that the duration of speed change is caused to be inappropriate.

For avoiding the above mentioned problems, there has been proposed another oil pressure control system for the automatic transmission such as disclosed in, for example, the Japanese patent application published before examination under publication number 63-3183. In such an oil pressure control system, target durations of speed change corresponding respectively to various speed change operations expected to be carried out in the automatic transmission are previously stored in a memory device contained in a control unit and the duration of speed change detected actually in the automatic transmission is compared with the target duration of speed change corresponding to the duration actually detected so as to produce a comparison output with which the pressure control variable used for controlling the line pressure is revised. However, in the case of the oil pressure control system for the automatic transmission wherein the pressure control variable used for controlling the line pressure is revised based on the output of comparison between the duration of speed change and the target duration of speed change stored in the memory device contained in the control unit, since the pressure control variable used for controlling the line pressure is revised regardless of the actual opening degree of the throttle valve, it is feared that the pressure control variable is not respondent to the operating condition of the engine with which the automatic transmission is coupled or the traveling condition of the vehicle.

For dealing with the above described problems, it is considered to store a large number of target durations of speed change corresponding respectively to various opening degrees of the throttle valve in the memory device in the control unit so that each target duration of speed change is read from the memory device in response to the actual opening degree of the throttle valve to be utilized to revise the pressure control variable used for controlling the line pressure. However, in such a case, since lots of labor are necessary to store the large number of target durations of speed change in the memory device and the memory device is required to have large capacity for memorization, the oil pressure control system for the automatic transmission comes to be expensive.

OBJECTS AND SUMMARY OF THE INVENTION

Accordingly, it is an object of the present invention to provide an oil pressure control system for an automatic transmission which avoids the aforementioned problems or disadvantages encountered with the prior art.

Another object of the present invention is to provide an oil pressure control system for an automatic transmission employed in a vehicle, in which a pressure control variable used for controlling line pressure supplied to an operating oil pressure producing device which supplies engaging friction elements in an automatic transmission with operating oil pressure, is obtained to be caused to reflect dispersion in characteristic and aged deterioration of the automatic transmission and to be respondent to operating condition of an engine with which the automatic transmission is coupled or traveling condition of the vehicle.

A further object of the present invention is to provide an oil pressure control system for an automatic transmission employed in a vehicle, in which a pressure control variable used for controlling line pressure supplied to an operating oil pressure producing device which supplies engaging friction elements in an automatic transmission with operating oil pressure, is revised in accordance with a comparison output obtained by comparing a duration of speed change detected actually in the automatic transmission with a predetermined target duration of speed change stored in a memory device and corresponding to the duration actually detected, so as to reflect dispersion in characteristic and aged deterioration of the automatic transmission and to be respondent to operating condition of an engine with which the automatic transmission is coupled or traveling condition of the vehicle, without requiring large capacity for memorization of the memory device and lots of labor for storing the large number of target durations of speed change in the memory device.

In accordance with the present invention, there is provided an oil pressure control system for an automatic transmission employed in a vehicle comprising a line pressure producing device for producing line pressure by adjusting oil pressure obtained from an oil pressure generating device provided in the automatic transmission, an operating oil pressure supplying device for producing operating oil pressure based on the line pressure and supplying engaging friction elements provided in the automatic transmission with the operating oil pressure, a first detector for detecting a speed change operation performed in the automatic transmission to produce a first detection output representing the detected operation, a second detector for detecting operating condition of an engine with which the automatic transmission is coupled to produce a second detection output representing the detected condition, a third detector for detecting a duration of speed change or a state of speed change to produce a third detection output representing the detected duration or state, a pressure control variable setting device for determining, based on the second detection output, a pressure control variable used for controlling the line pressure, a revising device for revising the third detection output based on the second detection output to produce a revised third detection output which corresponds to the third detecting output obtained under a condition wherein the second detection output represents a predetermined reference operating condition of the engine when the first detection output represents a specific speed change operation, a supplemental control variable setting device for determining a supplemental control variable, which is to be obtained when the second detection output represents the predetermined reference operating condition of the engine, based on a difference between the revised third detection output and a reference output representing the duration of speed change or the state of speed change which is to be detected under the condition wherein the second detection output represents to the predetermined reference operating condition of the engine, a supplemental control variable renewing device for renewing the supplemental control variable and storing a renewed supplemental control variable in a memory device, a supplemental control variable revising device for revising the supplemental control variable obtained from the supplemental control variable renewing device in accordance with the second detection output to produce a revised supplemental control variable when the first detection output represents the specific speed change operation, a pressure control variable revising device for revising the pressure control variable in accordance with the revised supplemental control variable to produce a revised pressure control variable, and a control device for causing the line pressure producing device to produce the line pressure in accordance with the revised pressure control variable when the first detection output represents the specific speed change operation.

With the oil pressure control system thus constituted in accordance with the present invention, in the case where the line pressure control is performed when a specific speed change operation, for example, a shifting-up operation is carried out in the automatic transmission, the pressure control variable used for controlling the line pressure supplied to the operating oil pressure supplying device which supplies the engaging friction elements with the operating oil pressure, is appropriately varied in response to variations in both of the duration of speed change and the operating condition of the engine with which the automatic transmission is coupled so as to be fit properly for the operating condition of the engine regardless of dispersion in characteristic and aged deterioration of the automatic transmission, so that abrasion on the engaging friction elements is reduced and shocks caused by the speed change are restrained in the automatic transmission.

Further, since the supplemental control variable is renewed and stored in the memory device only when the second detection output represents to the predetermined reference operating condition of the engine, the memory device is not required to have so large capacity for memorization.

The above, and other objects, features and advantages of the present invention will become apparent from the following detailed description which is to be read in conjunction with the accompanying drawings.

DESCRIPTION OF THE PREFERRED EMBODIMENT

Figure 1:
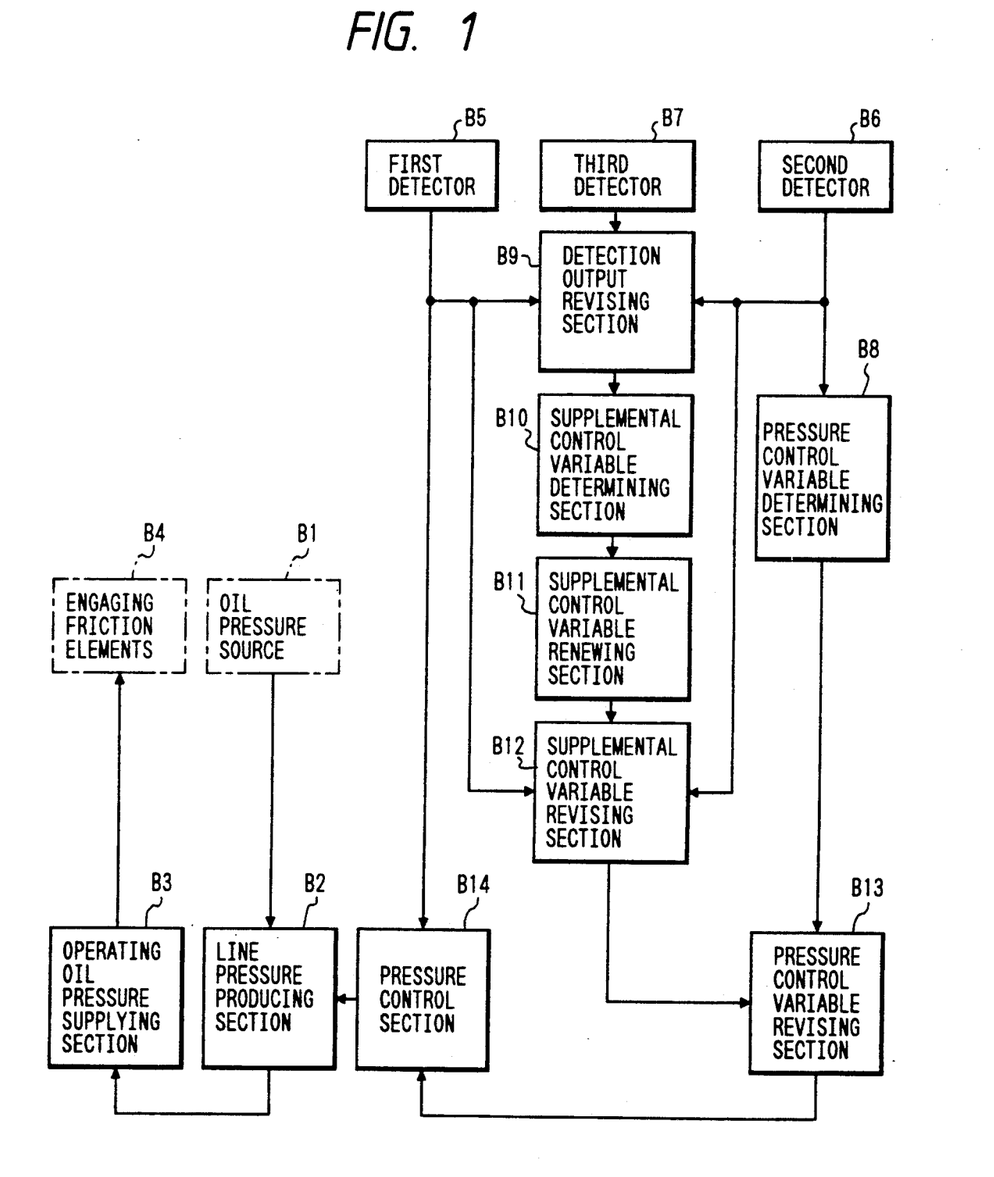
FIG. 1 is a block diagram illustrating the basic arrangement of an oil pressure control system for an automatic transmission according to the present invention.

FIG. 1 illustrates a functional block diagram of a system incorporating the present invention. In the functional block diagram of FIG. 1, the system comprising a line pressure producing section B2, an operating oil pressure supplying section B3, a first detector B5, a second detector B6, a third detector B7, a pressure control variable determining section B8, a detection output revising section B9, a supplemental control variable determining section B10, a supplemental control variable renewing section B11, a supplemental control variable revising section B12, a pressure control variable revising section B 13, and a pressure control section B14, and the line pressure producing section B2 and the operating oil pressure supplying section B3 are connected to an oil pressure source B1 and engaging friction elements B4, respectively.

The line pressure producing section B2 is operative to produce line pressure by adjusting oil pressure from the oil pressure source B1 and the operating oil pressure supplying section B3 is operative to produce operating oil pressure based on the line pressure obtained from the line pressure producing section B2 and to supply the engaging friction elements B4 provided in an automatic transmission with the operating oil pressure produced thereby. The first detector B5 is provided for detecting a speed change operation performed in the automatic transmission and producing a first detection output representing the detected operation. The second detector B6 is provided for detecting operating condition of an engine with which the automatic transmission is coupled or traveling condition of the vehicle and producing a second detection output representing the detected condition. The third detector B7 is provided for detecting a duration of speed change carried out in the automatic transmission and producing a third detection output representing the detected duration. The pressure control variable determining section B8 is operative to determine, based on the second detection output from the second detector B6, a pressure control variable used for controlling the line pressure. The detection output revising section B9 is operative to revise the third detection output from the third detector B7 based on the second detection output and to produce a revised third detection output signal which corresponds to the third detecting output obtained under a condition wherein the second detection output represents a predetermined reference operating condition of the engine or a predetermined reference traveling condition of the vehicle when the first detection output from the first detector B5 represents a specific speed change operation. The supplemental control variable determining section B10 is operative to determine a supplemental line pressure control variable, which is to be obtained when the second detection output represents the predetermined reference operating condition of the engine or the predetermined reference traveling condition of the vehicle, based on a difference between the revised third detection output and a reference output representing the duration of speed change which is to be detected under the condition wherein the second detection output represents to the predetermined reference operating condition of the engine or the predetermined reference traveling condition of the vehicle. The supplemental control variable renewing section B11 is operative to renew the supplemental line pressure control variable and to store a renewed supplemental line pressure control variable in a memory device. The supplemental control variable revising section B12 is operative to revise the supplemental line pressure control variable read from the memory in the supplemental control variable renewing section B11 in accordance with the second detection output and to produce a revised supplemental line pressure control variable when the first detection output represents the specific speed change operation. The pressure control variable revising section B13 is operative to revise the pressure control variable, which is obtained from the pressure control variable determining section B8, in accordance with the revised supplemental line pressure control variable and to produce a revised pressure control variable. The pressure control section B14 is operative to cause the line pressure producing section B2 to produce the line pressure in accordance with the revised pressure control variable obtained from the pressure control variable revising section B13 when the first detection output represents the specific speed change operation.

Figure 2:
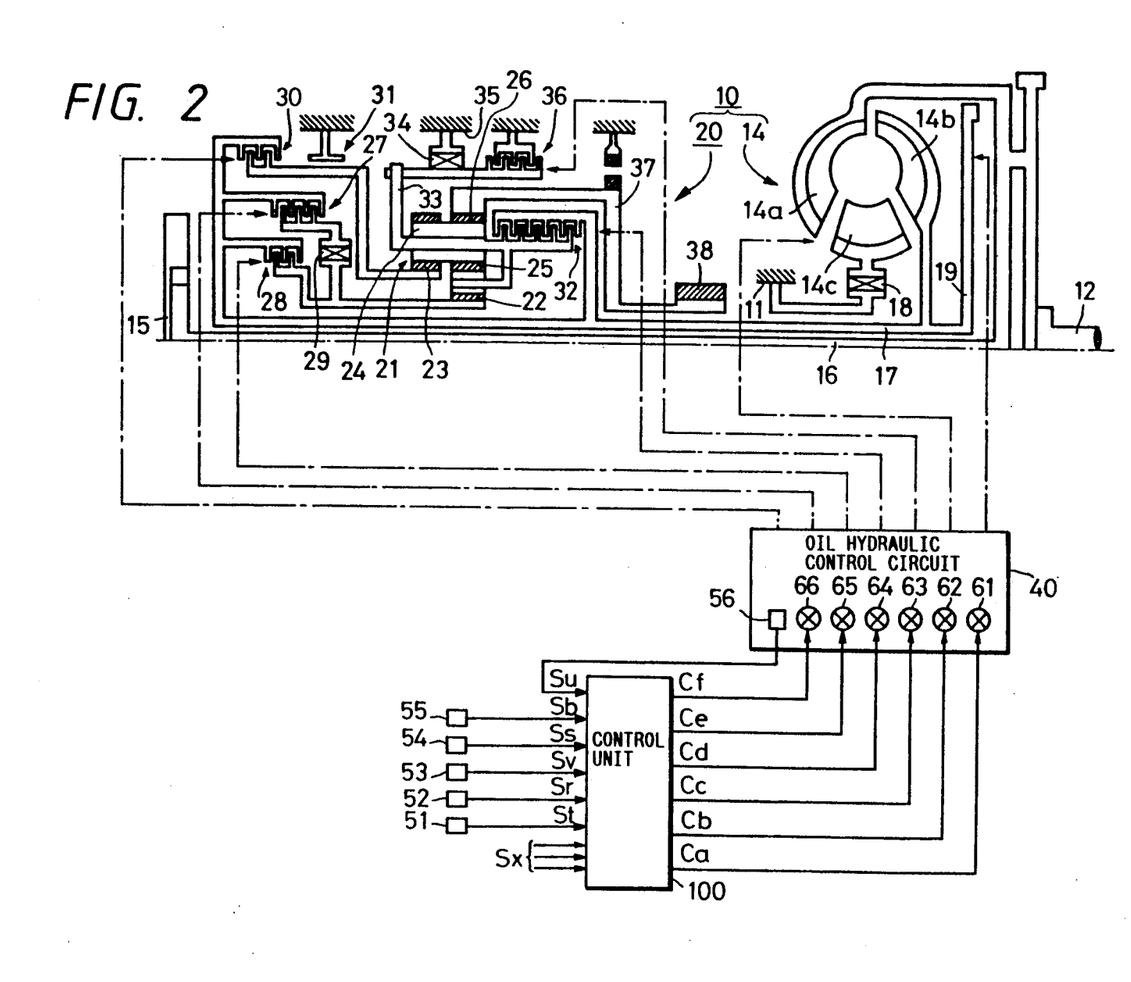
FIG. 2 is a schematic illustration showing one embodiment of air pressure control system for an automatic transmission according to the present invention, together with an example of an automatic transmission to which the embodiment is applied.

FIG. 2 illustrates an embodiment of oil pressure control system according to the present invention, together with an automatic transmission to which the embodiment is applied.

Referring to FIG. 2, an automatic transmission 10 employed in a vehicle comprises a torque converter 14 coupled with an output shaft 12 of an engine, a power transmitting gear arrangement 20 provided at the output side of the torque converter 14, and an oil pump 15 coupled through a pump driving shaft 16 with the output shaft 12.

The torque converter 14 comprises a pump impeller 14a secured to the output shaft 12, a turbine runner 14b coupled through a tubular turbine shaft 17 with the power transmitting gear arrangement 20 and coupled also through a lock-up clutch 19 with the output shaft 12, and a stator 14c coupled rotatably through a one-way clutch 18 with a case 11 of the torque converter 14. The one-way clutch 18 permits the stator 14c to revolve only in a direction common to the revolution of the pump impeller 14a.

The power transmitting gear arrangement 20 is provided with a planetary gear unit 21 for obtaining four forward speeds and one reverse speed. The planetary gear unit 21 comprises a small sun gear 22, a large sun gear 23, a long pinion gear 24, a short pinion gear 25 and a ring gear 26. A series connection of a forward clutch 27 for forward traveling and a one-way clutch 29 is disposed in parallel with a coast clutch 28 between the small sun gear 22 and the tubular turbine shaft 17. A reverse clutch 30 for reverse traveling and a 2-4 brake device 31 are connected in series between the large sun gear 23 and the tubular turbine shaft 17. A 3-4 clutch 32 is provided between the long pinion gear 24 and the tubular turbine shaft 17, and the long pinion gear 24 is coupled through a carrier 33 of the planetary gear unit 21 and a one-way clutch 34 with a case 35 of the power transmitting gear arrangement 20. The carrier 33 is selectively engaged through a low/reverse brake device 36 with the case 35. The ring gear 26 is connected through an output shaft 37 of the planetary gear unit 21 to an output gear 38.

The automatic transmission 10, which includes the torque converter 14, the power transmitting gear arrangement 20 and the oil pump 15 arranged as described above, is accompanied with an oil pressure control arrangement comprising an oil hydraulic control circuit 40 provided with an operating oil pressure supplying portion having solenoid valves 61, 62, 63, 64, 65 and 66 for supplying various portions of the automatic transmission 10 selectively with operating oil pressure and a control unit 100 for controlling the solenoid valves 61 to 66 in the oil hydraulic control circuit 40. The control unit 100 is supplied with a detection output signal St obtained from a throttle sensor 51 for detecting opening degree of a throttle valve (throttle opening degree), a detection output signal Sr obtained from a turbine speed sensor 52 for detecting revolving speed of the turbine runner 14b, a detection output signal Sv obtained from a speed sensor 53 for detecting traveling speed of the vehicle (vehicle speed), a detection output signal Ss obtained from a shift position sensor 54 for detecting a position of a shift lever, a detection output signal Sb obtained from a brake sensor 55 for detecting an operating condition of a brake pedal, a detection output signal Su obtained from a oil temperature sensor 56 for detecting oil temperature in the oil hydraulic control circuit 40, and other necessary detection output signals Sx, and operative to supply the solenoid valves 61 to 66 respectively with driving pulse signals Ca, Cb, Cc, Cd, Ce and Cf produced based on the detection output signals St, Sr, Sv, Ss, Sb, Su and Sx.

In the power transmitting gear arrangement 20 constituted as described above, a plurality of shift ranges including P (parking) range, R (reverse) range, N (neutral) range, D (driving) range, S range (1st range) and L range (2nd range), and a plurality of speeds including 1st to 4th speeds at forward ranges including the D, S and L ranges are obtained by causing the forward clutch 27, coast clutch 28, reverse clutch 30, 3-4 clutch 32, 2-4 brake device 31 and low/reverse brake device 36, each of which is formed into an engaging friction element, to work selectively.

Figure 3:
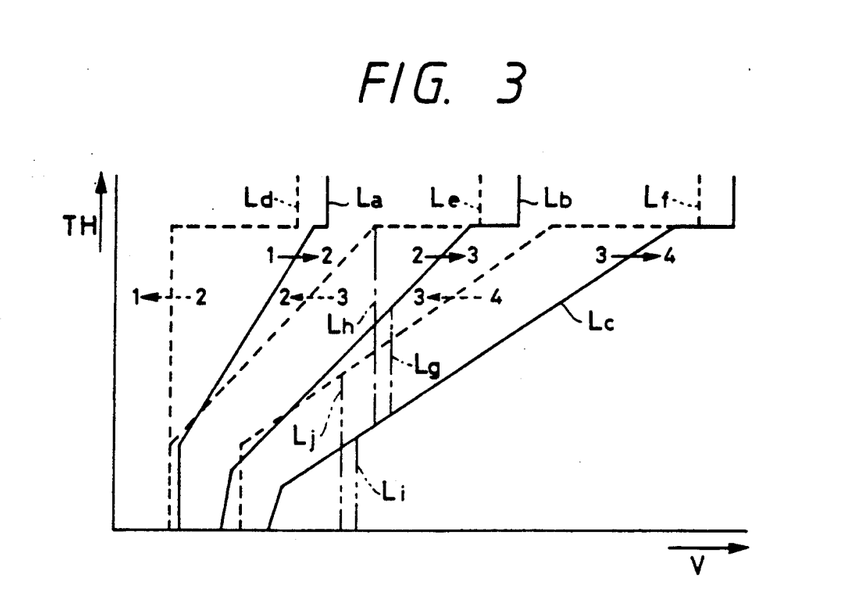
FIGS. 3 and 5 to 8 are characteristic charts used for explaining the operation of the embodiment shown in FIG. 2.

The control unit 100 is operative to perform a speed change control and lock-up control for the automatic transmission 10 in accordance with the detection output signals St, Sr, Sv, Ss, Sb, Su and Sx. When the speed change control and the lock-up control are carried out by the control unit 100, the throttle opening degree represented by the detection output signal St and the vehicle speed represented by the detection output signal Sv are collated with, for example, shifting lines La, Lb, Lc, Ld, Le, and Lf provided in a speed change characteristic chart as shown in FIG. 3, which has an abscissa representing vehicle speed V and an ordinate representing throttle opening degree TH and is stored in the form of data map in a memory device contained in the control unit 100, to check whether one of a plurality of shifting-up and shifting-down conditions is satisfied or not, and are also collated with lock-up setting lines Lg and Li and lock-up releasing lines Lh and Lj in the speed change characteristic chart of FIG. 3 to check whether one of a plurality of lock-up setting conditions and lock-up releasing conditions is satisfied or not. In the speed change characteristic chart of FIG. 3, the shifting lines La, Lb and Lc indicate respectively a speed change to the 2nd speed from the 1st speed, that is, 1-2 shifting-up operation, a speed-change to the 3rd speed from the 2nd speed, that is 2-3 shifting-up operation, and a speed-change to the 4th speed from the 3rd speed, that is 3-4 shifting-up operation, and the shifting lines Ld, Le and Lf indicate respectively a speed change to the 1st speed from the 2nd speed, that is, 2-1 shifting-down operation, a speed-change to the 2nd speed from the 3rd speed, that is 3-2 shifting-down operation, and a speed-change to the 3rd speed from the 4th speed, that is 4-3 shifting-down operation. Further, the lock-up setting lines Lg and Li indicate respectively lock-up operations at the 3rd and 4th speeds, and the lock-up releasing lines Lh and Lj indicate respectively lock-up releasing operations at the 3rd and 4th speeds.

When a change of speed range in the power transmitting gear arrangement 20 is detected based on the detection output signal Ss and one of conditions for the 1-2, 2-3 and 3-4 shifting-up operations and 2-1, 3-2, 4-3 shifting-down operations is satisfied, the control unit 100 is operative to produce the driving pulse signals Ca, Cb, Cc and Cd in such a manner as to fit the satisfied condition for the shifting-up or shifting-down operation and to supply the solenoid valves 61 to 64 provided in the operating oil pressure supplying portion of the oil hydraulic control circuit 40 with the driving pulse signals Ca, Cb, Cc and Cd selectively. Therefore, various shift valves and other elements in the operating oil pressure supplying portion are changed in their operating conditions to cause changes in application of the operating oil pressure to the engaging friction elements in the power transmitting gear arrangement 20 so that a desired speed at a desired speed range is obtained.

The control unit 100 is operative also to supply the solenoid valve 65 provided in the operating oil pressure supplying portion of the oil hydraulic control circuit 40 with the driving pulse signal Ce when the lock-up setting condition is satisfied, and to cease to supply the solenoid valve 65 with the driving pulse signal Ce when the lock-up releasing condition is satisfied, so that the lock-up clutch 19 is caused selectively to be in engagement with the output shaft 12 in accordance with the lock-up setting lines Lg and Li and to be disengagement from the output shaft 12 in accordance with the lock-up releasing lines Lh and Lj.

The control unit 100 is further operative to perform a line pressure control. On the occasion of the line pressure control, the control unit 100 supplies the solenoid valve 66 provided in the operating oil pressure supplying portion of the oil hydraulic control circuit 40 with the driving pulse signal Cf which has its pulse duty factor determined as described later so that a line pressure which is a base of the operating oil pressure produced in the oil hydraulic control circuit 40 is controlled to vary in such a manner as described later in accordance with the driving pulse signal Cf.

Figure 4:
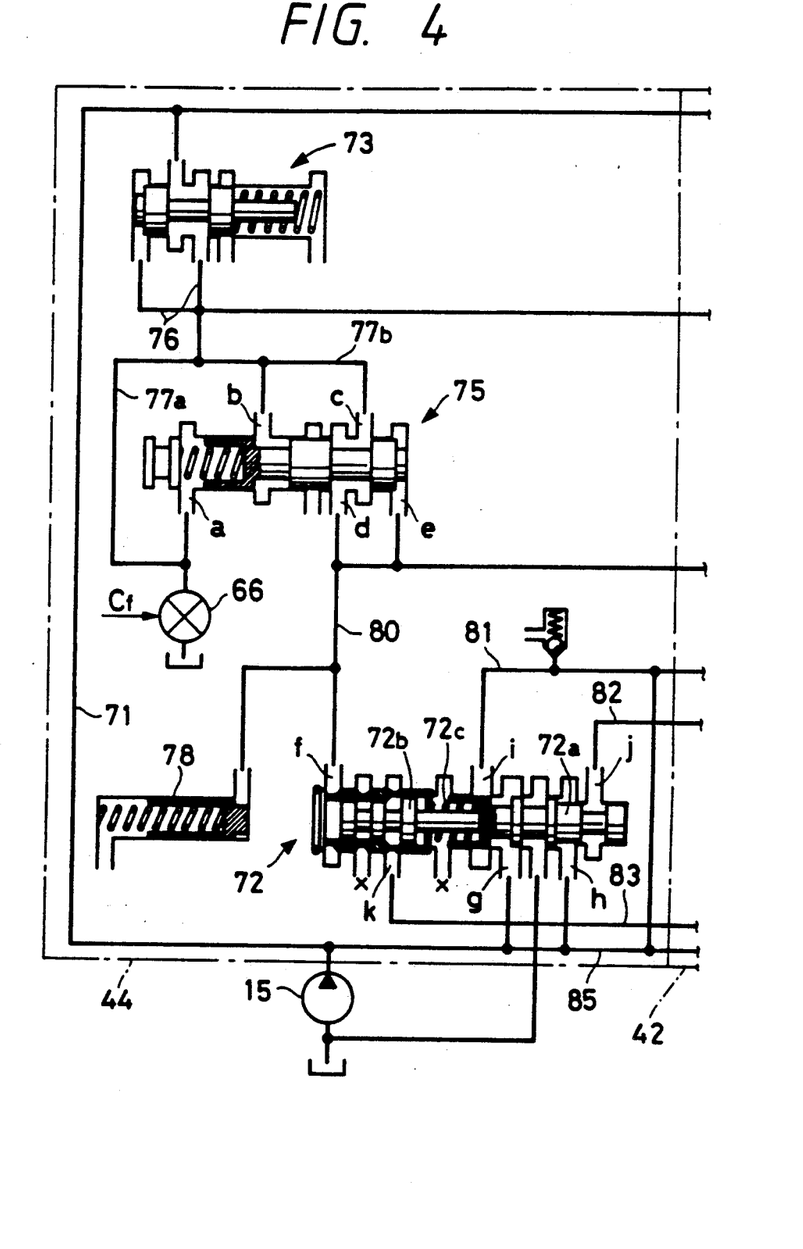
FIG. 4 is a schematic illustration showing a part of an oil hydraulic control circuit arrangement employed in the embodiment shown in FIG. 1.

FIG. 4 shows a part of an example of a line pressure producing portion 44 contained in the oil hydraulic control circuit 40, in which the line pressure is controlled in accordance with the driving pulse signal Cf supplied thereto from the control unit 100.

Referring to FIG. 4, the line pressure producing portion 44 is provided with a regulator valve 72 and a pressure reducing valve 73 both connected through an oil pressure line 71 to the oil pump 15, a modulator valve 75 disposed between the regulator valve 72 and the pressure reducing valve 73, and the solenoid valve 66 which is normally in its ON state and operative to control the operation of the modulator valve 75. In such a line pressure producing portion 44, the oil pressure obtained from the oil pump 15 is supplied through the oil pressure line 71 to the pressure reducing valve 73 and reduced to have an appropriate value by the pressure reducing valve 73. The oil pressure reduced by the pressure reducing valve 73 is supplied to a port a of the modulator valve 75 through an oil pressure line 76 and an oil pressure line 77a to which the solenoid valve 66 is connected and supplied also to ports b and c of the modulator valve 75 through the oil pressure lines 76 and an oil pressure line 77b. The oil pressure applied to the port a of the modulator valve 75 is varied in response to the duration of the ON state of the solenoid valve 66 which corresponds to the pulse width of the driving pulse signal Cf and thereby an effective opening area of each of the ports b and c of the modulator valve 75 is varied to adjust the oil pressure applied to the ports b and c of the modulator valve 75 from the pressure reducing valve 73. The adjusted oil pressure is further supplied to a port e of the modulator valve 75 through a port d of the modulator valve 75 and also supplied to a port f of the regulator valve 72, as a pilot pressure, through an oil pressure line 80 to which a pressure damper 78 is connected.

The regulator valve 72 has two spools 72a and 72b and a spring 72c disposed between the spools 72a and 72b. Further, the regulator valve 72 has ports g and h and ports i, j and k connected respectively to oil pressure lines 81, 82 and 83 each connected to an operating oil supplying portion 42, in addition to the port f. In the regulator valve 72, an effective opening area of each of the ports g and h is varied in accordance with the pilot pressure which is adjusted in response to the driving pulse signal Cf and supplied through the oil pressure line 80 to the port f and thereby the oil pressure obtained at the ports g and h are adjusted to produce the line pressure. The line pressure thus produced is supplied from the ports g and h through an oil pressure line 85 and branch lines therefrom to the operation oil pressure supplying portion 42. In the operation oil pressure supplying portion 42, the line pressure is adjusted in accordance with operating conditions of shift valves and other elements or caused to pass threrethrough without being adjusted to be supplied selectively to the engaging friction elements in the power transmitting gear arrangement 20 as the operating oil pressure.

The line pressure obtained from the line pressure producing portion 44 in such a manner as described above is subjected to a normal line pressure control which is carried out by the control unit 100 when the speed change operation is not performed in the power transmitting gear arrangement 20 or to a speed change line pressure control which is carried out by the control unit 100 during the speed change operation performed in the power transmitting gear arrangement 20.

On the occasion of the normal line pressure control, a fundamental line pressure value is determined based on the throttle opening degree represented by the detection output signal St and the vehicle speed represented by the detection output signal Sv, and a fundamental duty factor is set based on the fundamental line pressure value and the oil temperature represented by the detection output signal Su. The fundamental duty factor is larger, the smaller the fundamental line pressure value is or the higher the oil temperature is.

Figure 5:
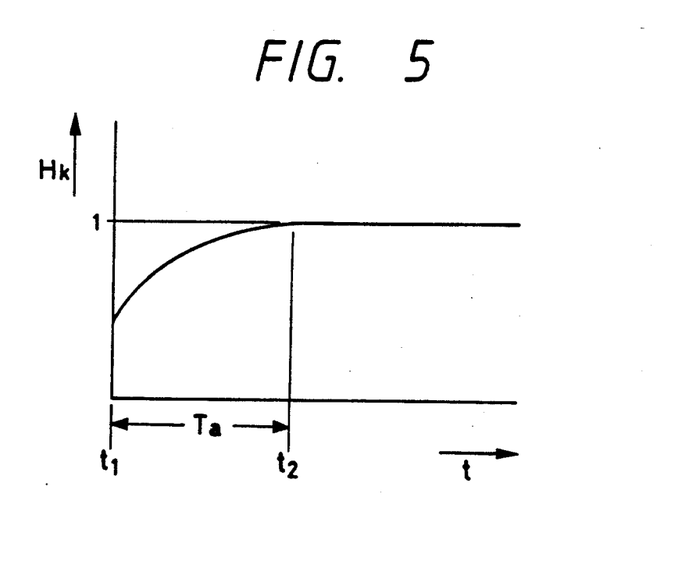

The fundamental duty factor thus obtained is revised by being multiplied by a correction factor Hk having its value which increases in accordance with a lapse of time to be smaller than 1 during a predetermined period of time Ta from a time point $t_1$ at which an ignition switch is turned on to a time point $t_2$ and is constant to be 1 after the predetermined period of time Ta, as shown in FIG. 5. This revision of the fundamental duty factor is conducted for the purpose of avoiding such a situation that the operating oil pressure is undesirably reduced due to air contained in operation oil in the oil hydraulic control circuit 40 immediately after the time point at which the ignition switch is turned on and produces a revised duty factor.

Then, the driving pulse signal Cf having the pulse width corresponding to the revised duty factor is produced and supplied to the solenoid valve 66. The solenoid valve 66 is opened during each period of time corresponding to the pulse width of the driving pulse signal Cf so as to reduce the pilot pressure supplied through the oil pressure line 77a to the port a of the modulator valve 75. Consequently, the line pressure obtained at the ports g and h of the regulator valve 72 is adjusted.

Figure 6:
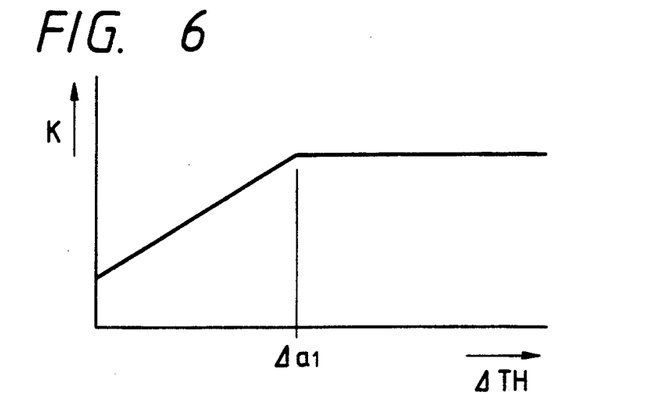

On the occasion of the speed change line pressure control, in the case where the condition for the shifting-down operation is satisfied, a fundamental line pressure value is determined based on a shifting-down mode in the power transmitting gear arrangement 20 and the turbine speed represented by the detection output signal Sr. This fundamental line pressure value is arranged to be larger, the higher the turbine speed is. Then, an effective line pressure value is obtained by multiplying the fundamental line pressure value by a correction factor K which has a predetermined constant value when a rate of change $\Delta$TH of the throttle opening degree TH is equal to or larger than a predetermined value $\Delta$al and decreases from the predetermined constant value in accordance with decrease of the rate of change $\Delta$TH of the throttle opening degree TH from the predetermined value $\Delta$al, as shown in FIG. 6. A fundamental duty factor is set based on the effective line pressure value and the oil temperature represented by the detection output signal Su. The fundamental duty factor is larger, the larger the effective line pressure value is or the higher the oil temperature is.

The fundamental duty factor thus obtained is revised in the same manner as that obtained under the normal line pressure control to produce a revised duty factor and the driving pulse signal Cf having the pulse width corresponding to the revised duty factor is produced and supplied to the solenoid valve 66.

On the other hand, in the case where the condition for the shifting-up operation is satisfied, a fundamental line pressure value is determined based on a shifting-up mode in the power transmitting gear arrangement 20 and the throttle opening degree represented by the detection output signal St. This fundamental line pressure value is arranged to be larger, the higher the throttle opening degree is. The fundamental line pressure value is utilized to a pressure control variable used for controlling the line pressure. The line pressure variable thus obtained is revised in accordance with a supplemental pressure control variable which is obtained as a resultant of learning function to reflect a duration of speed change carried out in the power transmitting gear arrangement 20, so as to produce a revised pressure control variable.

Then, a fundamental duty factor is set based on the revised pressure control variable and the oil temperature represented by the detection output signal Su. The fundamental duty factor is larger, the larger the revised pressure control variable is or the higher the oil temperature is. This fundamental duty factor is also revised in the same manner as that obtained under the normal line pressure control to produce a revised duty factor and the driving pulse signal Cf having the pulse width corresponding to the revised duty factor is produced and supplied to the solenoid valve 66.

The above described line pressure control by the control unit 100 is effected by a microcomputer contained in the control unit 100. One example of a set of operation programs for the line pressure control is carried out in the microcomputer contained in the control unit 100 in accordance with flow charts shown in FIGS. 9 to 12.

Figure 9:
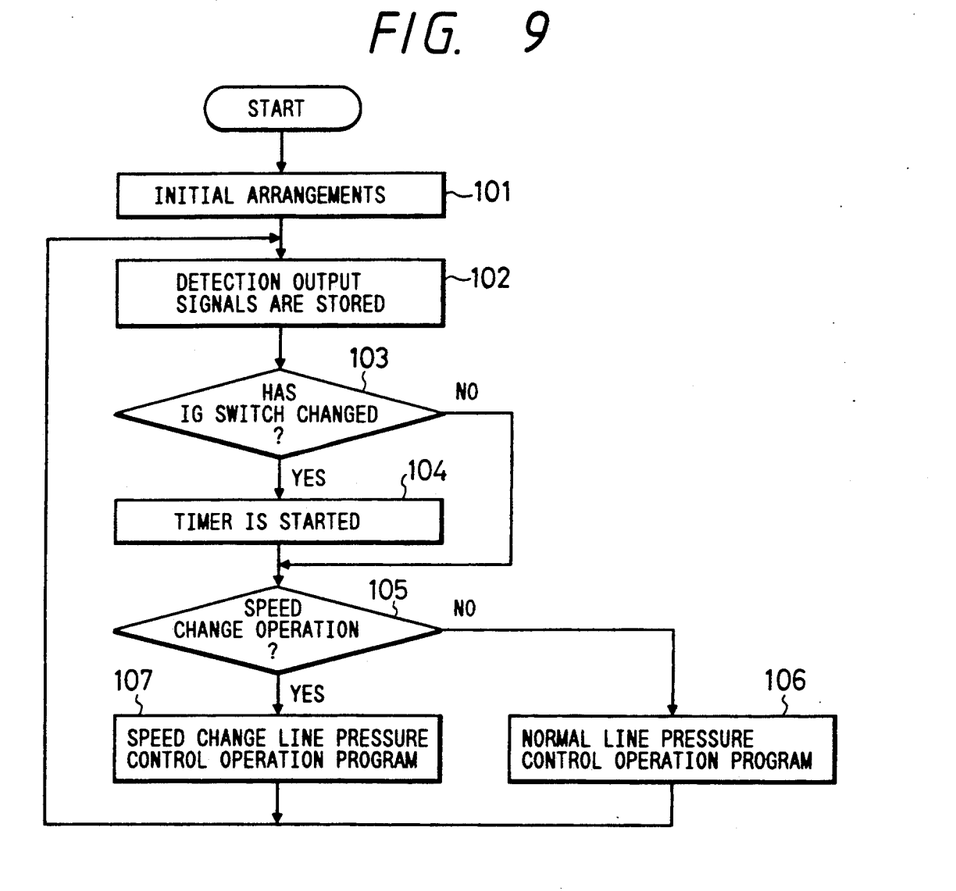
FIGS. 9 to 12 are flow charts showing examples of operational programs for a microcomputer used in a control unit employed in the embodiment shown in FIG. 2.

According to the flow chart shown in FIG. 9, first, in step 101, initial arrangements are conducted to set various flags to be zero, and in step 102, the detection output signals St, Sr, Sv, Ss, Sb, Su and Sx are stored. Then, in step 103, it is checked whether an ignition switch (IG switch) has changed into its ON state or not. When the ignition switch has changed, a timer contained in the microcomputer is started in step 104 and the process advances to step 105. On the other hand, when the ignition switch has not changed but been kept in its ON state, the process advances directly to the step 105 from the step 103.

Figure 10:
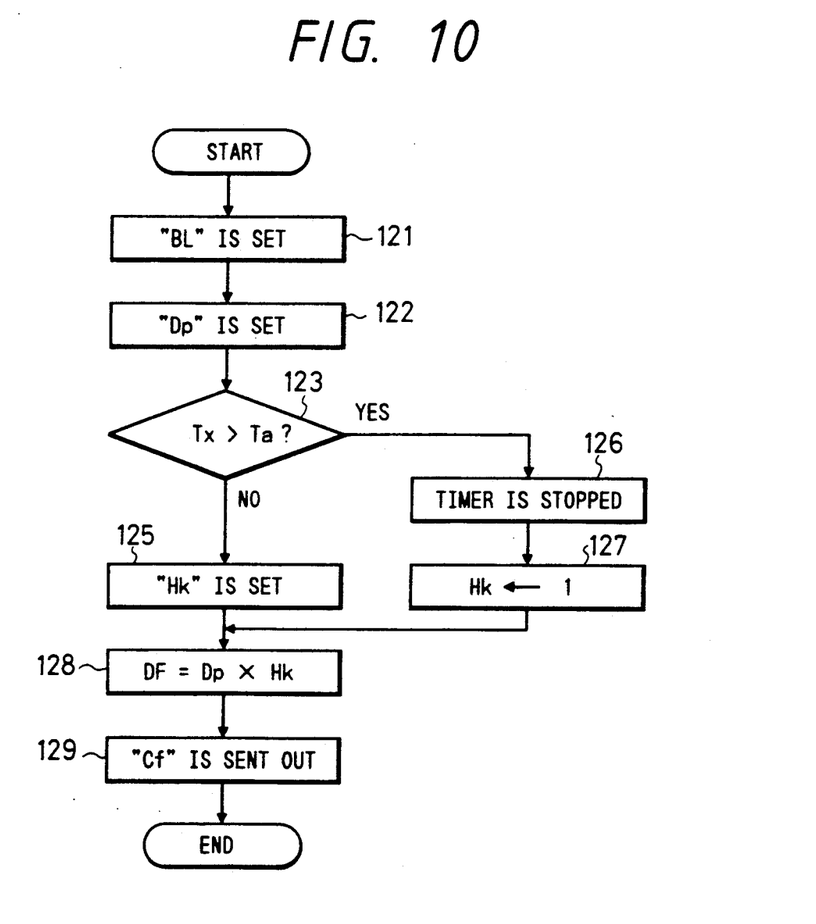
Figure 11:
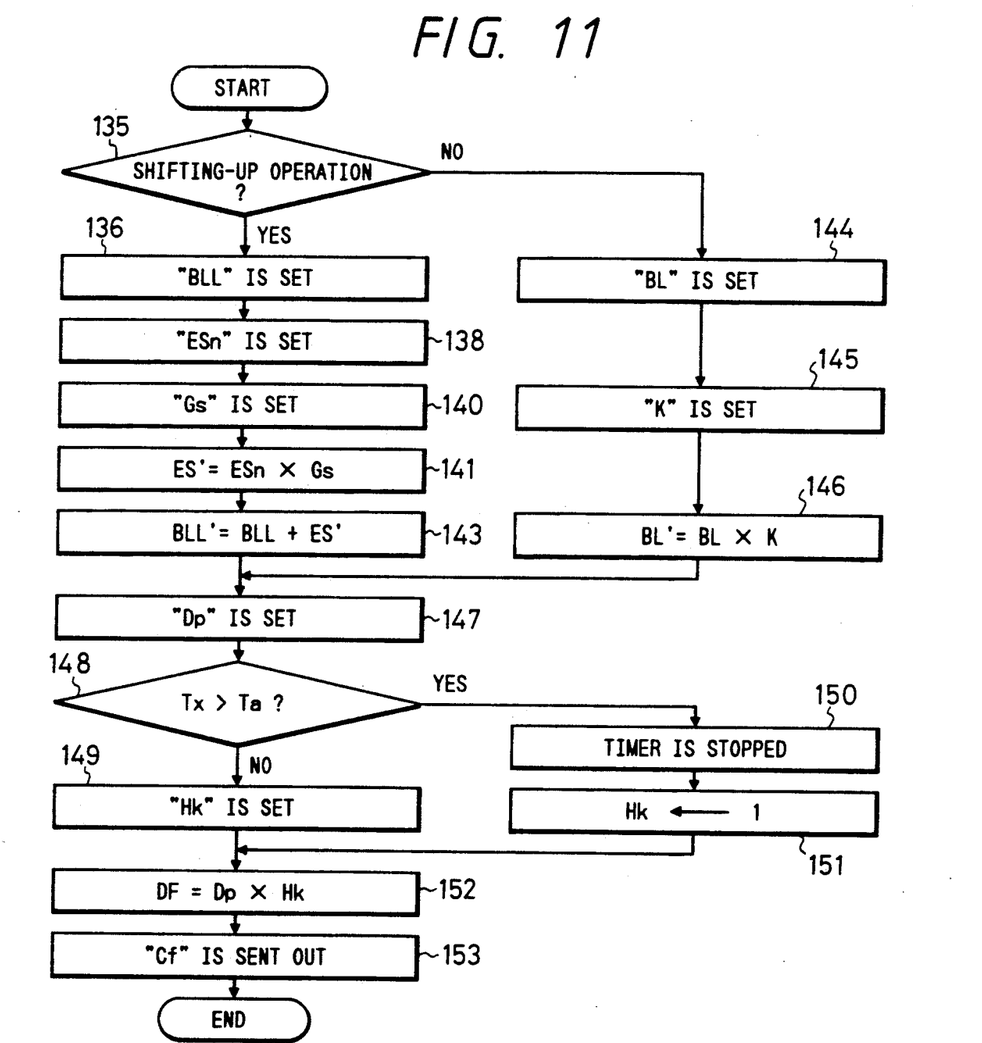

In the step 105, it is checked whether the speed change operation is going on or not. If it is clarified that the speed change operation is not performed, an operation program for the normal line pressure control, which will be explained in detail with reference to the flow chart shown in FIG. 10, is carried out in step 106, and if it is clarified that the speed change operation is going on, an operation program for the speed change line pressure control, which will be explained in detail with reference to the flow chart shown in FIG. 11, is carried out in step 107. Then, the process returns to the step 102.

According to the flow chart shown in FIG. 10 by which the operation program for the normal line pressure control is carried out, first, in step 121, a fundamental line pressure value BL is set based on the throttle opening degree TH represented by the detection output signal St and the vehicle speed V represented by the detection output signal Sv. Next, in step 122, a fundamental duty factor Dp is set based on the fundamental line pressure value BL and the oil temperature represented by the detection output signal Su. Then, in step 123, it is checked on the strength of the measurement by the timer whether a time Tx elapsed after the time point $t_1$ at which the ignition switch turned on is longer than the predetermined period of time Ta or not. If the time Tx elapsed after the time point $t_1$ is equal to or shorter than the predetermined period of time Ta, the correction factor Hk is set to have a value increasing in accordance with a lapse of time to be smaller than 1 as shown in FIG. 5, in step 125, and the process advances to step 128. To the contrary, if the time Tx elapsed after the time point $t_1$ is longer than the predetermined period of time Ta, the timer is stopped in step 126, then the correction factor Hk is set to be 1 in step 127, and the process advances to the step 128.

In the step 128, the fundamental duty factor Dp obtained in the step 122 is revised by being multiplied by the correction factor Hk obtained in the step 125 or 127 to produce a revised duty factor DF by which the pulse width of the driving pulse signal Cf is determined. After that, the driving pulse signal Cf is produced to have its pulse width corresponding to the revised duty factor DF and sent out to the solenoid valve 66, in step 129, and then the program is terminated.

According to the flow chart shown in FIG. 11 by which the operation program for the speed change line pressure control is carried out, first, in step 135, it is checked whether the speed change operation is the shifting-up operation or not. If it is clarified that the speed change operation is the shifting-up operation, a fundamental line pressure value BL is set based on the shifting-up mode and the throttle opening degree TH represented by the detection output signal St and then formed into a pressure control variable BLL, in step 136. After that, the shifting-up mode is collated with data maps concerning supplemental control variables stored in a memory contained in the control unit 100 so that a supplemental control variable ESn corresponding to the shifting-up mode is obtained in accordance with the data maps concerning supplemental control variables, in step 138, and the throttle opening degree TH is collated with a correction factor data map stored in the memory contained in the control unit 100 so that a correction factor Gs corresponding to the throttle opening degree TH is read from the correction factor data map, in step 140. Further, a revised supplemental control variable ES' is calculated by multiplying the supplemental control variable ESn obtained in the step 138 by the correction factor Gs obtained in the step 140, in step 141. Then, in step 143, a revised pressure control variable BLL' is calculated by adding the revised supplemental control variable ES' to the pressure control variable BLL obtained in the step 136, and the process advances to step 147.

On the other hand, if it is clarified in the step 135 that the speed change operation is not the shifting-up operation but the shifting-down operation, a fundamental line pressure value BL is set based on the shifting-down mode in the power transmitting gear arrangement 20 and a turbine speed Nt represented by the detection output signal Sr, in step 144, and the correction factor K is set based on the rate of change ΔTH of the throttle opening degree TH in such a manner as shown in FIG. 6, in step 145. Then, an effective line pressure value BL' is calculated by multiplying the fundamental line pressure value BL obtained in the step 144 by the correction factor K obtained in the step 145, in step 146, and the process advances to the step 147.

In the step 147, a fundamental duty factor Dp is set based on the revised pressure control variable BLL' obtained in the step 143 or the effective line pressure value BL' obtained in the step 146 and the oil temperature represented by the detection output signal Su. After that, the processes in steps 148 to 153 are carried out in the same manner as those in the steps 123 to 129 of the flow chart shown in FIG. 10, and then the program is terminated.

Figure 12:
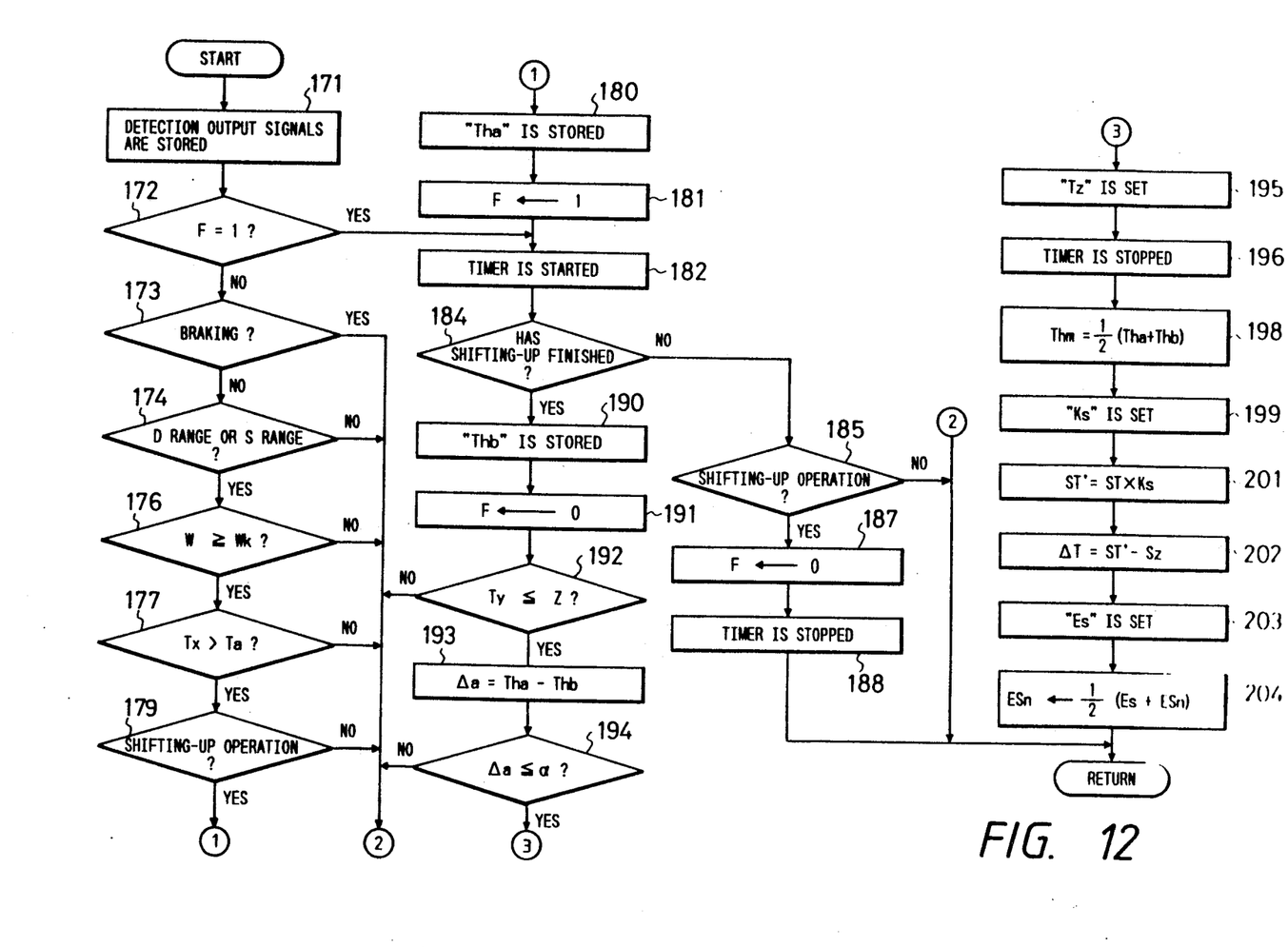

Under the speed change line pressure control performed in a situation where the condition for the shifting-up operation is satisfied as described above, the revised supplemental control variable ESn is obtained through an operation program for determining a supplemental control variable which is carried out in accordance with the flow chart of FIG. 12.

According to the flow chart of FIG. 12, first, in step 171, the detection output signals are stored, and then, it is checked whether a flag F which is to be 1 when the condition for the shifting-up operation is satisfied is set to be 1 or not, in step 172. If the flag F is not set to be 1, it is checked based on the detection output signal Sb whether a brake pedal is operated or not, in step 173. If the brake pedal is not operated, it is checked based on the detection output signal Ss whether the D range or S range is selected in the power transmitting gear arrangement 20 or not, in step 174. If the D range or S range is selected, the process advances to step 176.

In the step 176, it is checked whether an oil temperature W represented by the detection output signal Su is equal to or higher than a predetermined temperature Wk or not. If the oil temperature W is equal to or higher than the predetermined temperature Wk, it is checked on the strength of the measurement by the timer whether a time Tx elapsed after the time point $t_1$ at which the ignition switch turned on is longer than the predetermined period of time Ta or not, in step 177. As a result, if the time Tx elapsed after the time point $t_1$ is longer than the predetermined period of time Ta, the vehicle is in a stable traveling condition and therefore it is checked by collating the throttle opening degree TH and vehicle speed V represented respectively by the detection output signals St and Sv with the speed change characteristic chart as shown in FIG. 3 whether the condition for the shifting-up operation is satisfied or not, in step 179. If the condition for the shifting-up operation is satisfied, a value Tha of the throttle opening degree TH represented by the detection output signal St on that occasion is stored in the memory, in step 180. Then, the flag F is set to be 1 in step 181 and the process advances to step 182.

When it is clarified in the step 172 that the flag F is set to be 1, the process advances directly to the step 182 from the step 172. Further, if it is clarified that the brake pedal is operated in the step 173, that a speed range other than the D and S ranges is selected in the step 174, that the oil temperature W is lower than the predetermined temperature Wk in the step 176, the time Tx elapsed after the time point $t_1$ is equal to or shorter than the predetermined period of time Ta in the step 177, or that the condition for the shifting-up operation is not satisfied in the step 179, the process returns to the step 171.

In the step 182, the timer contained in the control unit 100 is started to measure a duration of speed change Ty. Then, it is checked based on the turbine speed represented by the detection output signal Sr whether the shifting-up operation has finished or not, in step 184. When it is clarified in the step 184 that the shifting-up operation has not finished, the condition for the shifting-up operation is newly satisfied or not, in step 185. If the condition for the shifting-up operation is satisfied, since a new shifting-up operation is to be performed before the former shifting-up operation has not completed, the flag F is set to be 0 in step 187, the timer is stopped in step 188, and then the process returns to the step 171. To the contrary, if the condition for the shifting-up operation is not satisfied, the process returned directly to the step 171 from the step 185.

On the other hand, when it is clarified in the step 184 that the shifting-up operation has finished, a value Thb of the throttle opening degree TH represented by the detection output signal St on that occasion is stored in the memory, in step 190. Then, the flag F is set to be 0 in step 191 and the process advances to step 192.

In the step 192, it is checked based on measurement of the timer whether the duration of speed change Ty is equal to or shorter than a predetermined period of time Z or not. If the duration of speed change Ty is longer than the predetermined period of time Z, the process returns to the step 171, and if the duration of speed change Ty is equal to or shorter than the predetermined period of time Z, the process advances to step 193. In the step 193, a difference $\Delta a$ between the value Tha of the throttle opening degree TH stored at a time point at which the condition of the shifting-up operation is satisfied and the value Thb of the throttle opening degree TH stored at a time point at which the condition of the shifting-up operation is completed, is calculated, and it is checked whether the difference $\Delta a$ is equal to or smaller than a predetermined value $\alpha$ or not, in step 194. If the difference $\Delta a$ is larger than the predetermined value $\alpha$, the process returns to the step 171, and if the difference $\Delta a$ is equal to or smaller than the predetermined value $\alpha$, the process advances to step 195.

Figure 7:
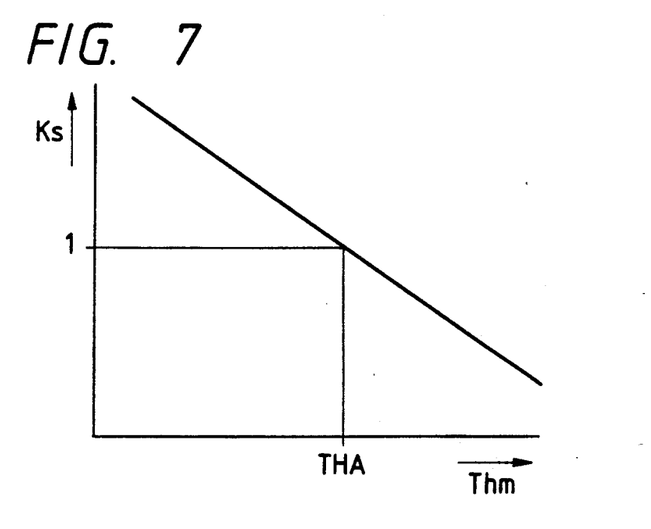

In the step 195, the shifting-up mode on that occasion is collated with a data map of appropriate duration of speed change which is stored in the memory in the control unit 100 so that an appropriate duration of speed change Tz corresponding to that shifting-up mode is read from the data map of appropriate duration of speed change. Then, the timer which has measured the duration of speed change Ty is stopped, in step 196, and an average value Thm of the throttle opening degree TH during a period of time from the time point at which the condition of the shifting-up operation is satisfied to the time point at which the shifting-up operation is completed, is calculated in accordance with an equation: Thm=(Tha+Thb)×$\frac{1}{2}$, in step 198. After that, the average value Thm obtained in the step 198 is collated with a correction factor data map which indicates a linear relation between average value Thm and correction factor Ks as shown in FIG. 7 and stored in the memory contained in the control unit 100 so that a correction factor Ks corresponding to the average value Thm obtained in the step 198 is read from the correction factor data map, in step 199. The correction factor Ks is set to be 1 when the average value Thm is THA which corresponds to a half of a maximum throttle opening degree.

Next, in step 201, a duration value ST corresponding to the duration of speed change Ty measured by the timer is set and further a revised duration value ST' is calculated by multiplying the duration value ST by the correction factor Ks obtained in the step 199. Then, a difference $\Delta T$ between the revised duration value ST' obtained in the step 201 and a duration value Sz corresponding to the appropriate duration of speed change Tz read from the data map of appropriate duration of speed change in the step 195 is calculated, in step 202, and the process advances to step 203.

Figure 8:
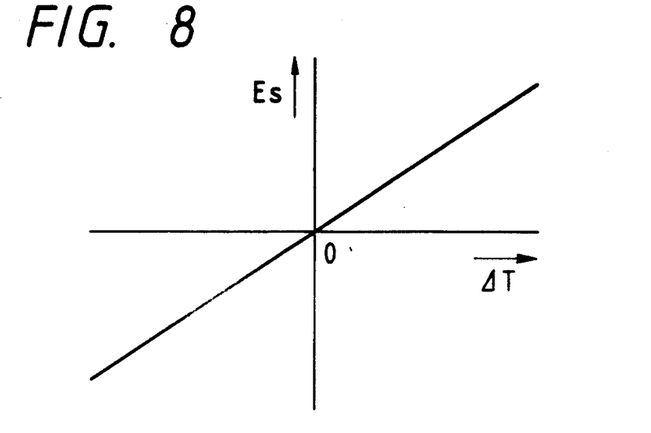

In the step 203, the difference $\Delta T$ obtained in the step 202 is collated with a data map for supplemental control variable which indicates a linear relation between difference $\Delta T$ and supplemental control variable Es as shown in FIG. 8 and stored in the memory contained in the control unit 100 so that a supplemental control variable Es corresponding to the difference $\Delta T$ obtained in the step 202 is read from the data map for supplemental control variable. After that, in step 204, the supplemental control variable ESn is renewed by dividing by two the sum of the supplemental control variable Es obtained in the step 203 and the supplemental control variable ESn which has already stored in the memory contained in the control unit 100 on that occasion, and the renewed supplemental control variable ESn is newly stored in the memory. Then, the program returns to the step 171.

Although the detection output of the duration of speed change is used for determining the supplemental control variable under the speed change line pressure control in the above described embodiment, it is possible to use, in place of the detection output of the duration of speed change, a detection output of the state of speed change, such as a detection output of a rate of variation of the turbine speed in the torque converter 14 for determining the supplemental control variable under the speed change line pressure control.

What is claimed is:

1. An oil pressure control system for an automatic transmission employed in a vehicle, the system comprising:

line pressure producing means for producing line pressure by adjusting oil pressure obtained from oil pressure generating means provided in the automatic transmission, operating oil pressure supplying means for producing operating oil pressure based on the line pressure and supplying engaging friction elements provided in the automatic transmission with the operating oil pressure, first detecting means for detecting a speed change operation performed in the automatic transmission to produce a first detection output, second detecting means for detecting operating condition of an engine with which the automatic transmission is coupled to produce a second detection output, third detecting means for detecting one of a duration of speed change and a state of speed change to produce a third detection output, pressure control variable setting means for determining, based on the second detection output, a pressure control variable used for controlling the line pressure, revising means for revising said third detection output based on the second detection output to produce a revised third detection output which corresponds to the third detecting output obtained under a condition wherein the second detection output represents predetermined reference operating condition of the engine when the first detection output represents a specific speed change operation, supplemental control variable setting means for determining a supplemental control variable, which is to be obtained when the second detection output represents the predetermined reference operating condition of the engine, based on a difference between the revised third detection output and a respective reference output representing one of the duration of speed change and the state of speed change which is to be detected under the condition wherein the second detection output represents to the predetermined reference operating condition of the engine, supplemental control variable renewing means for renewing the supplemental control variable and storing a renewed supplemental control variable in a memory device, supplemental control variable revising means for revising the supplemental control variable obtained from the supplemental control variable renewing means in accordance with the second detection output to produce a revised supplemental control variable when the first detection output represents the specific speed change operation, pressure control variable revising means for revising the pressure control variable in accordance with the revised supplemental control variable to produce a revised pressure control variable, and control means for causing the line pressure producing means to produce the line pressure in accordance with the revised pressure control variable when the first detection output represents the specific speed change operation.

2. An oil pressure control system according to claim 1, wherein said first detecting means is operative to produce the first detection output representing said specific speed change operation when a shifting-up operation performed in the automatic transmission is detected.

3. An oil pressure control system according to claim 1, wherein said second detecting means is operative to detect opening degree of throttle in the engine and to produce the second detection output representing detected opening degree of throttle.

4. An oil pressure control system according to claim 3, wherein said second detecting means is operative to produce the second detection output representing said predetermined reference operating condition of the engine when the opening degree of throttle is a half of a maximum opening degree.

5. An oil pressure control system according to claim 1, wherein said third detecting means is operative to detect the duration of speed change in the automatic transmission.

6. An oil pressure control system according to claim 5, wherein said first detecting means is operative to produce the first detection output representing said specific speed change operation when a shifting-up operation performed in the automatic transmission is detected, said second detecting means is operative to detect opening degree of throttle in the engine and produce the second detection output representing detected opening degree of throttle, and said third detecting means is operative to detect the duration of speed change in the automatic transmission.

7. An oil pressure control system according to claim 6, wherein said second detecting means is operative to produce the second detection output representing said predetermined reference operating condition of the engine when the opening degree of throttle is a half of a maximum opening degree.

8. An oil pressure control system according to claim 7, wherein said revising means is operative to obtain a correction factor based on an average opening degree of throttle during a period of time from a first time point at which a condition for the shifting-up operation is satisfied to a second time point at which the shifting-up operation is completed and to multiply the third detection output obtained from said third detecting means by said correction factor to produce said revised third detection output.

9. An oil pressure control system according to claim 8, wherein said supplemental control variable setting means is operative to obtain an appropriate duration of speed change corresponding to a speed change operation in the automatic transmission and to determine the supplemental control variable based on a difference between the revised third detection output obtained from the revising means and said appropriate duration of speed change.

10. An oil pressure control system according to claim 1, wherein said control means is operative to produce a pulse signal having its pulse duty factor determined in accordance with the revised pressure control variable and to apply said pulse signal to a solenoid valve provided in said line pressure producing means for adjusting the line pressure.

* * * * *